United States Patent
McDaniel et al.

(10) Patent No.: US 8,889,599 B1
(45) Date of Patent: Nov. 18, 2014

(54) METHODS FOR USE OF OIL-SOLUBLE WEIGHTING AGENTS IN SUBTERRANEAN FORMATION TREATMENT FLUIDS

(71) Applicant: Halliburton Energy Services, Inc., Houston, TX (US)

(72) Inventors: Cato Russell McDaniel, Houston, TX (US); Dale E. Jamison, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 5 days.

(21) Appl. No.: 13/897,599

(22) Filed: May 20, 2013

(51) Int. Cl.
- *C09K 8/06* (2006.01)
- *C09K 8/82* (2006.01)
- *C09K 8/32* (2006.01)

(52) U.S. Cl.
CPC .... *C09K 8/32* (2013.01); *C09K 8/82* (2013.01)
USPC ........................................ 507/105; 166/305.1

(58) Field of Classification Search
USPC ........................................ 507/105; 166/305.1
See application file for complete search history.

(56) References Cited

U.S. PATENT DOCUMENTS

| | | | |
|---|---|---|---|
| 2,584,041 A * | 1/1952 | Nowak et al. | 530/230 |
| 3,897,470 A | 7/1975 | Sias | |
| 4,337,160 A | 6/1982 | Sample, Jr. | |
| 4,525,285 A | 6/1985 | Son et al. | |
| 4,633,001 A | 12/1986 | Cells | |
| 4,720,352 A * | 1/1988 | Petronella et al. | 516/20 |
| 5,905,061 A | 5/1999 | Patel | |
| 5,977,031 A | 11/1999 | Patel | |
| 6,828,279 B2 | 12/2004 | Patel et al. | |
| 7,534,745 B2 | 5/2009 | Taylor et al. | |
| 7,645,723 B2 | 1/2010 | Kirsner et al. | |
| 7,696,131 B2 | 4/2010 | Oyler et al. | |
| 2005/0277553 A1 | 12/2005 | Massam et al. | |
| 2007/0266622 A1 * | 11/2007 | Hu | 44/437 |
| 2009/0192052 A1 | 7/2009 | Zhang | |
| 2012/0165231 A1 | 6/2012 | Miller et al. | |

OTHER PUBLICATIONS

International Search Report and Written Opinion for PCT/US2014/037460 dated Sep. 25, 2014.

* cited by examiner

*Primary Examiner* — Alicia Bland
(74) *Attorney, Agent, or Firm* — McDermott Will & Emery LLP; Holly Soehnge

(57) ABSTRACT

Methods of treating a subterranean formation including providing a treatment fluid comprising an oil-based fluid component and an oil-soluble weighting agent that comprises a metal, wherein the oil-soluble weighting agent has a density in the range of from about 1.1 $g/cm^3$ to about 22 $g/cm^3$; solubilizing the oil-soluble weighting agent in the oil-based fluid component of the treatment fluid, wherein the oil-soluble weighting agent increases the density of the oil-based fluid component of the treatment fluid; introducing the oil-based treatment fluid into a wellbore in a subterranean formation.

18 Claims, 1 Drawing Sheet

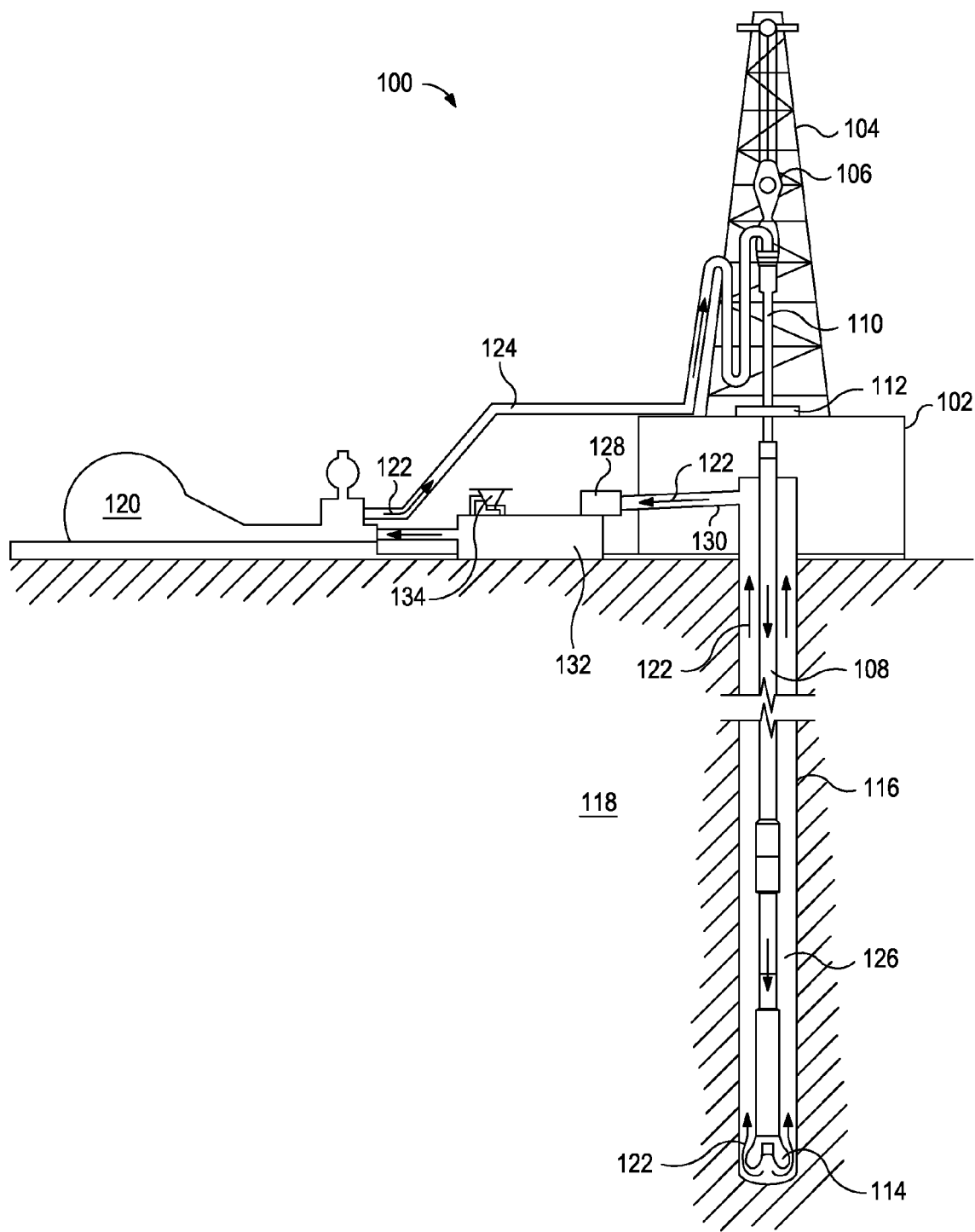

METHODS FOR USE OF OIL-SOLUBLE WEIGHTING AGENTS IN SUBTERRANEAN FORMATION TREATMENT FLUIDS

BACKGROUND

The present invention relates to methods for use of oil-soluble weighting agents in subterranean formation treatment fluids.

Subterranean formation treatment fluids (also referred to herein as "treatment fluids") may be used in various capacities during the drilling, completion, and/or production of an oil and gas well, such drilling operations, as lost circulation operations, sand control operations, fracturing operations, frac-packing operations, gravel packing operations, and the like (also referred to herein as "subterranean operations"). Many of these operations require the treatment fluids to possess a density sufficient to suspend particulates, such as drill cuttings, formation fines, and proppant particulates, for example. As such, it has long been desired that treatment fluids possess sufficient density to suspend such particulates. Moreover, the density of a treatment fluid contributes to the stability of a wellbore by increasing the pressure exerted by the treatment fluid onto the surface of the subterranean formation so as to prevent undesirable inflow of reservoir fluids into the wellbore.

In order to increase the density of treatment fluids, weighting agents are typically added to the fluids. However, the use of treatment fluids comprising weighting agents during the drilling, completion, and/or production of oil and gas wells often results in sedimentation or "sag." Sag is characterized by the settling out of the weighting agents from the treatment fluids, resulting in density variations throughout the treatment fluid (i.e., some portions of the treatment fluids have higher than desirable densities and some portions of the treatment fluids have lower than desirable densities). Sag may lead to numerous issues such as lost circulation, cementing problems, collapsed pipe, and the like and may be caused by various operational factors, such as well design, the mass of the weighting agents, the formulations of the treatment fluid, and the like.

In order to combat the sag phenomenon, soluble weighting agents have been developed for aqueous base fluids, including salt based weighting agents. These soluble weighting agents increase the density of the aqueous base fluids but, because they are solubilized, they do not face the problems (such as settling and sag) common to particulate weighting agents. These soluble weighting agents have proven very effective for use in aqueous treatment fluids. However, subterranean operations often benefit from the use of oil-based (including oil emulsion) treatment fluids. These treatment fluids are incapable of solubilizing the soluble weighting agents that are compatible with aqueous base fluids. Therefore, a method of increasing the density of an oil-based treatment fluid with a soluble weighting agent may be of benefit to one of ordinary skill in the art.

SUMMARY OF THE INVENTION

The present invention relates to methods for use of oil-soluble weighting agents in subterranean formation treatment fluids. In some embodiments, the present invention provides a method comprising: providing a treatment fluid comprising an oil-based fluid component and an oil-soluble weighting agent that comprises a metal, wherein the oil-soluble weighting agent has a density in the range of from about 1.1 g/cm$^3$ to about 22 g/cm$^3$; solubilizing the oil-soluble weighting agent in the oil-based fluid component of the treatment fluid, wherein the oil-soluble weighting agent increases the density of the oil-based fluid component of the treatment fluid; introducing the oil-based treatment fluid into a wellbore in a subterranean formation.

In other embodiments, the present invention provides a method comprising: providing a treatment fluid comprising an oil-based fluid component and an oil-soluble weighting agent that comprises a metal, solubilizing the oil-soluble weighting agent in the oil-based fluid component of the treatment fluid, wherein the oil-soluble weighting agent increases the density of the oil-based fluid component to a density in the range of from about 0.8 g/cm$^3$ to about 3.0 g/cm$^3$; introducing the oil-based treatment fluid into a wellbore in a subterranean formation.

In still other embodiments, the present invention provides a method of drilling a wellbore in a subterranean formation comprising: providing a treatment fluid comprising an oil-based fluid component and an oil-soluble weighting agent that comprises a metal; wherein the oil-soluble weighting agent has a density in the range of from about 1.1 g/cm$^3$ to about 22 g/cm$^3$; solubilizing the oil-soluble weighting agent in the oil-based fluid component of the treatment fluid, wherein the oil-soluble weighting agent increases the density of the oil-based fluid component to a density in the range of from about 0.8 g/cm$^3$ to about 3.0 g/cm$^3$; and circulating the treatment fluid during the drilling of the wellbore in the subterranean formation.

The features and advantages of the present invention will be readily apparent to those skilled in the art upon a reading of the description of the preferred embodiments that follows.

BRIEF DESCRIPTION OF THE DRAWINGS

The following FIGURE is included to illustrate certain aspects of the present invention, and should not be viewed as an exclusive embodiment. The subject matter disclosed is capable of considerable modifications, alterations, combinations, and equivalents in form and function, as will occur to those skilled in the art and having the benefit of this disclosure.

FIG. 1 is a side view of a wellbore drilling assembly with which the oil-soluble weighting agents of the present invention may be used.

DETAILED DESCRIPTION

The present invention relates to methods for use of oil-soluble weighting agents in subterranean formation treatment fluids. Specifically, the present invention relates to oil-soluble weighting agents that at least partially overcome sag.

In some embodiments, the present invention provides for a method of treating a subterranean formation comprising providing a treatment fluid comprising an oil-based fluid component and an oil-soluble weighting agent that comprises a metal. The oil-soluble weighting agent is capable of solubilizing in the oil-based fluid component, producing a dense treatment fluid that may be substantially solids-free, wherein the solubilized oil-soluble weighting agent increases the density of the oil-based fluid component. The treatment fluid is introduced into a wellbore in the subterranean formation.

The oil-based fluid component of the present invention may be any oil-based fluid suitable for use in a subterranean formation operation, including synthetic oils. Oils suitable for use in the oil-based fluids of the present invention may include, but are not limited to, an alkane; an olefin (e.g., an olefin having a $C_6$-$C_{18}$ linear internal portion); an aromatic organic compound; a cyclic alkane; a paraffin; a diesel fluid; a mineral oil; a kerosene; an ester (e.g., an ester having a $C_2$-$C_{12}$ alcohol portion and a $C_{16}$-$C_{24}$ carboxylic acid portion); a synthetic oil; canola oil; fish oil; sunflower oil; corn oil; olive oil; cottonseed oil; peanut oil; an ether (e.g., an ether having a $C_6$-$C_{24}$ portion); an amide; an alpha olefin; a poly alpha olefin; an amine; a polyolefin; a polydiorganosiloxane; a siloxane; an organosiloxane; an acetal; a dialkycarbonate; a hydrocarbon; and any combination thereof.

In some embodiments, the oil-based fluid component may include a water-in-oil emulsion, known as an invert emulsion, or an oil-in-water emulsion. Suitable invert emulsions may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the treatment fluid, where the amount may range from any lower limit to any upper limit and encompass any subset there between. Examples of suitable invert emulsions include those disclosed in U.S. Pat. Nos. 5,905,061; 5,977,031; 6,828,279; 7,534,745; 7,645,723; and 7,696,131, each of which are incorporated herein by reference in their entirety. Suitable oil-in-water emulsions may have a water-to-oil ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the treatment fluid, where the amount may range from any lower limit to any upper limit and encompass any subset there between.

The oil-based fluid component is capable of solubilizing the oil-soluble weighting agents of the present invention. Any oil-soluble weighting agent that is capable of solubilizing in the oil-based fluids and that is suitable for use in a subterranean operation may be used with the methods of the present invention, provided that the oil-soluble weighting agent is capable of increasing the density of the oil-based fluid. Suitable oil-soluble weighting agents for use in the present invention include, but are not limited to, metal salts of carboxylic acid; metal salts of sulfonic acid; oil-soluble chealants (e.g., an oil soluble chealant of acetylacetone); and any combination thereof. Such oil-soluble weighting agents for use in the present invention may include, but are not limited to, a metal sulfonate; a metal salt of an aliphatic carboxylic acide; a metal salt of an alicyclic carboxylic acid; a ferrocene; a ferrocene derivative; a metal acetylacetonate; a metal naphthenate; a metal 2-ethylhexanoate; a metal octanoate; a metal trifluoromethanesulfonate; an organic material containing chlorine; an organic material containing fluorine; an organic material containing a metal; and any combination thereof. As used herein, the term "metal" may encompass metaloids and metalorganic compounds. The organic material typically has heavy metals present in an amount in the range of from about 5% to about 25% for each heavy metal. The term "derivative" is defined herein as any compound that is made from one of the listed compounds, for example, by replacing one atom in one of the listed compounds with another atom or group of atoms, ionizing one of the listed compounds, or creating a salt of one of the listed compounds.

Suitable metals to form the oil-soluble weighting agents (e.g., in the metal salts of an alicyclic carboxylic acid, the metal octanoate, the organic material containing a metal, and the like) may be high density metals, such that the oil-based fluid component of the treatment fluid of the present invention increases in density upon solubilizing the oil-soluble weighting agent therein. As used herein, the term "high density metal" refers to a metal (including a metalloid or metalorganic compound) having a density in the range of from about 1.7 g/cm$^3$ to about 22 g/cm$^3$. Metals that may be useful in forming the oil-soluble weighting agents of the present invention include, but are not limited to, aluminum; barium; bismuth; calcium; cerium; chromium; cobalt; copper; erbium; europium; gadolinium; gallium; hafnium; holmium; indium; iridium; iron; lanthanum; lutetium; magnesium; molybdenum; neodymium; niobium; strontiumtin; tungsten; vanadium; zinc; zirconium; and any combination thereof.

By way of nonlimiting example, specific metal acetylacetonates suitable for use in the methods of the present invention include, but are not limited to, iron acetylacetonate; gallium acetylacetonate; and any combination thereof. By way of nonlimiting example, a specific metal naphthenate suitable for use in the methods of the present invention includes, but is not limited to, magnesium naphthenate. Also, by way of nonlimiting example, specific metal 2-ethylhexanoates suitable for use in the methods of the present invention include, but are not limited to, tin 2-ethylhexanoate; bismuth 2-ethylhexanoate; molybdenum 2-ethylhexanoate; and any combination thereof. By way of non-limiting example, a specific metal octanoate suitable for use in the present invention includes, but is not limited to, zirconium octanoate. Additionally, by way of nonlimiting example, a specific metal trifluoromethanesulfonates suitable for use in the present invention includes, but is not limited to, gallium trifluoromethanesulfonate.

In some embodiments, the oil-soluble weighting agents of the present invention in their final form may have a density of greater than about 1.1 g/cm$^3$. In some embodiments, the oil-soluble weighting agents of the present invention in their final form have a density in the range of from about 1.1 g/cm$^3$ to about 22 g/cm$^3$. However, any compound capable of acting as an oil-soluble weighting agent of the present invention that solubilizes in the oil-based fluid compound while imparting increased density may be used in the methods of the present invention.

In some embodiments, the oil-soluble weighting agents of the present invention are capable of increasing the densities of the oil-based fluid component, and therefore, the treatment fluid, in the range of from about 0.8 g/cm$^3$ to about 3.0 g/cm$^3$.

The oil-soluble weighting agents of the present invention may advantageously be used to stabilize the oil-based fluids of the present invention that are emulsions or inverted emulsions. To stabilize an emulsion, the oil-soluble weighting agents may be used to adjust the density of the oil phase of the emulsion such that it is the same or similar to the density of the water phase of the emulsion. When the oil and water in the emulsion have the same density, there may be little or no driving force for settling or sag governed by Stokes Law (i.e., capable of maintaining particulates in suspension), and the buoyancy of other particulates included in the treatment fluid may be increased.

As previously mentioned, the oil-soluble weighting agents of the present invention are capable of increasing the density of the treatment fluid. Traditionally, treatment fluids are made denser by adding solids to the fluid. Because the oil-soluble weighting agents of the present invention increase the density of a fluid without the use of solids (i.e., because they are soluble in the treatment fluid), such treatment fluids may possess a high density value while achieving a low viscosity. The increased density imparts buoyancy to the fluid to counteract or reduce sag of other particulates included in the treatment fluid and the relatively low viscosity may reduce equivalent circulating density ("ECD"), which may improve drilling hydraulics and efficiencies. As used herein, the term "equivalent circulating density" or "ECD" refers to the effective density exerted by a circulating fluid against a subterranean formation, which takes into account the pressure drop in the annulus above the point being evaluated.

In some embodiments, the treatment fluids of the present invention may further comprise an inert solid; a fluid loss control agent; an emulsifier; a dispersion aid; a corrosion inhibitor; a viscosifying agent; a gelling agent; a particulate; a proppant; a lost circulation material; a foaming agent; a gas; a pH control additive; a breaker; a biocide; a crosslinker; a stabilizer; a scale inhibitor; a clay stabilizing agent; a brine; and any combination thereof.

Embodiments disclosed herein include:

A. A method comprising providing a treatment fluid comprising an oil-based fluid component and an oil-soluble weighting agent that comprises a metal, wherein the oil-soluble weighting agent has a density in the range of from about 1.1 g/cm$^3$ to about 22 g/cm$^3$. The oil-soluble weighting agent is capable of solubilizing in the oil-based fluid component, producing a dense treatment fluid that may be substantially solids-free, wherein the solubilized oil-soluble weighting agent increases the density of the oil-based fluid component. The treatment fluid is introduced into a wellbore in the subterranean formation.

B. A method comprising providing a treatment fluid comprising an oil-based fluid component and an oil-soluble weighting agent that comprises a metal. The oil-soluble weighting agent is capable of solubilizing in the oil-based fluid component, producing a dense treatment fluid that may be substantially solids-free, wherein the solubilized oil-soluble weighting agent increases the density of the oil-based fluid component in the range of from about 0.8 g/cm$^3$ to about 3.0 g/cm$^3$. The treatment fluid is introduced into a wellbore in the subterranean formation.

C. A method of drilling a wellbore in a subterranean formation comprising providing a treatment fluid comprising an oil-based fluid component and an oil-soluble weighting agent that comprises a metal, wherein the oil-soluble weighting agent has a density in the range of from about 1.1 g/cm$^3$ to about 22 g/cm$^3$. The oil-soluble weighting agent is capable of solubilizing in the oil-based fluid component, producing a dense treatment fluid that may be substantially solids-free, wherein the solubilized oil-soluble weighting agent increases the density of the oil-based fluid component in the range of from about 0.8 g/cm$^3$ to about 3.0 g/cm$^3$. The treatment fluid is circulated during the drilling of the wellbore in the subterranean formation.

Each of embodiments A, B, and C may have one or more of the following additional elements in any combination:

Element 1: Wherein the oil-soluble weighting agent increases the density of the oil-based fluid component to a density in the range of from about 0.8 g/cm$^3$ to about 3.0 g/cm$^3$.

Element 2: Wherein the increased density of the oil-based fluid component caused by the oil-soluble weighting agent reduces the equivalent circulating density of the treatment fluid.

Element 3: Wherein the oil-soluble weighting agent is selected from the group consisting of a metal salt of carboxylic acid; a metal salt of sulfonic acid; an oil-soluble chealant; and any combination thereof.

Element 4: Wherein the oil-soluble weighting agent is selected from the group consisting of a metal sulfonate; a metal salt of an aliphatic carboxylic acid; a metal salt of an alicyclic carboxylic acid; a ferrocene; a ferrocene derivative; a metal acetylacetonate; a metal naphthenate; a metal 2-ethylhexanoate; a metal octanoate; a metal trifluoromethanesulfonate; an organic material containing chlorine; an organic material containing fluorine; an organic material containing a metal; and any combination thereof.

Element 5: Wherein the oil-soluble weighting agent is a metal sulfonate, a metal salt of an aliphatic carboxylic acid, a metal salt of an alicyclic carboxylic acid, a metal acetylacetonate, a metal naphthenate, a metal 2-ethylhexanoate, a metal octanoateoctanoate, a metal trifluoromethanesulfonate, or a organic material containing a metal, and the metal is selected from the group consisting of aluminum; barium; bismuth; calcium; cerium; chromium; cobalt; copper; erbium; europium; gadolinium; gallium; hafnium; holmium; indium; iridium; iron; lanthanum; lutetium; magnesium; molybdenum; neodymium; niobium; strontium; tin; tungsten; vanadium; zinc; zirconium; and any combination thereof.

Element 6: Wherein the oil-soluble weighting agent is a metal acetylacetonate selected from the group consisting of iron acetylacetonate; beryllium acetylacetonate; gallium acetylacetonate; and any combination thereof.

Element 7: Wherein the oil-soluble weighting agent is a metal naphthenate selected from magnesium naphthenate.

Element 8: Wherein the oil-soluble weighting agent is a metal 2-ethylhexanoate selected from the group consisting of tin 2-ethylhexanoate; bismuth 2-etheylhexanoate; molybdenum 2-ethylhexanoate; and any combination thereof.

Element 9: Wherein the oil-soluble weighting agent is a metal octanoate selected from zirconium octanoate.

Element 10: Wherein the oil-soluble weighting agent is a metal trifluoromethanesulfonate selected from gallium trifluoromethanesulfonate.

Element 11: Wherein the oil-soluble weighting agent has a density in the range of from about 1.1 to about 22 g/cm$^3$.

Element 12: Wherein the drilling fluid further comprises an additive selected from the group consisting of an inert solid; a fluid loss control agent; an emulsifier; a dispersion aid; a corrosion inhibitor; a viscosifying agent; a gelling agent; a particulate; a proppant; a lost circulation material; a foaming agent; a gas; a pH control additive; a breaker; a biocide; a crosslinker; a stabilizer; a scale inhibitor; a clay stabilizing agent; a brine and any combination thereof.

By way of non-limiting example, exemplary combinations applicable to A, B, C include: A with 12; B with 6, 7, 8, and 12; B with 10; C with 2, 8, and 9.

The exemplary oil-soluble weighting agents disclosed herein may directly or indirectly affect one or more components or pieces of equipment associated with the preparation, delivery, recapture, recycling, reuse, and/or disposal of the disclosed oil-soluble weighting agents. For example, and with reference to FIG. 1, the disclosed oil-soluble weighting agents may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the disclosure.

One or more of the disclosed oil-soluble weighting agents may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed oil-soluble weighting agents may be added to the drilling fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the disclosed oil-soluble weighting agents may be stored, reconditioned, and/or regulated until added to the drilling fluid 122.

As mentioned above, the disclosed oil-soluble weighting agents may directly or indirectly affect the components and equipment of the drilling assembly 100. For example, the disclosed oil-soluble weighting agents may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 may further include one or more sensors, gauges, pumps, compressors, and the like to used store, monitor, regulate, and/or recondition the exemplary oil-soluble weighting agents.

The disclosed oil-soluble weighting agents may directly or indirectly affect the pump 120, which representatively includes any conduits, pipelines, trucks, tubulars, and/or pipes used to fluidically convey the oil-soluble weighting agents downhole, any pumps, compressors, or motors (e.g., topside or downhole) used to drive the oil-soluble weighting agents into motion, any valves or related joints used to regulate the pressure or flow rate of the oil-soluble weighting agents, and any sensors (i.e., pressure, temperature, flow rate, etc.), gauges, and/or combinations thereof, and the like. The disclosed oil-soluble weighting agents may also directly or indirectly affect the mixing hopper 134 and the retention pit 132 and their assorted variations.

The disclosed oil-soluble weighting agents may also directly or indirectly affect the various downhole equipment and tools that may come into contact with the oil-soluble weighting agents such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed oil-soluble weighting agents may also directly or indirectly affect any downhole heat exchangers, valves and corresponding actuation devices, tool seals, packers and other wellbore isolation devices or components, and the like associated with the wellbore 116. The disclosed oil-soluble weighting agents may also directly or indirectly affect the drill bit 114, which may include, but is not limited to, roller cone bits, PDC bits, natural diamond bits, any hole openers, reamers, coring bits, etc.

While not specifically illustrated herein, the disclosed oil-soluble weighting agents may also directly or indirectly affect any transport or delivery equipment used to convey the oil-soluble weighting agents to the drilling assembly 100 such as, for example, any transport vessels, conduits, pipelines, trucks, tubulars, and/or pipes used to fluidically move the oil-soluble weighting agents from one location to another, any pumps, compressors, or motors used to drive the oil-soluble weighting agents into motion, any valves or related joints used to regulate the pressure or flow rate of the oil-soluble weighting agents, and any sensors (i.e., pressure and temperature), gauges, and/or combinations thereof, and the like.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
    providing a treatment fluid comprising an oil-based fluid component and an oil-soluble weighting agent that comprises a metal selected from the group consisting of iron acetylacetonate; beryllium acetylacetonate; gallium acetylacetonate; gallium trifluorormethanesulfonate; and any combination thereof, wherein the oil-soluble weighting agent has a density in the range of from about 1.1 g/cm$^3$ to about 22 g/cm$^3$;

solubilizing the oil-soluble weighting agent in the oil-based fluid component of the treatment fluid, wherein the oil-soluble weighting agent increases the density of the oil-based fluid component of the treatment fluid;

introducing the oil-based treatment fluid into a wellbore in a subterranean formation.

2. The method of claim 1, wherein the oil-soluble weighting agent increases the density of the oil-based fluid component to a density in the range of from about 0.8 g/cm$^3$ to about 3.0 g/cm$^3$.

3. The method of claim 1, wherein the increased density of the oil-based fluid component caused by the oil-soluble weighting agent reduces the equivalent circulating density of the treatment fluid.

4. The method of claim 1, wherein the oil-soluble weighting agent further comprises an additional metal selected from the group consisting of a metal salt of carboxylic acid; a metal salt of sulfonic acid; an oil-soluble chealant; and any combination thereof.

5. The method of claim 1, wherein the oil-soluble weighting agent further comprises an additional metal selected from the group consisting of a metal sulfonate; a metal salt of an aliphatic carboxylic acid; a metal salt of an alicyclic carboxylic acid; a ferrocene; a ferrocene derivative; a metal acetylacetonate; a metal naphthenate; a metal 2-ethylhexanoate; a metal octanoate; a metal trifluoromethanesulfonate; an organic material containing chlorine; an organic material containing fluorine; an organic material containing a metal; and any combination thereof.

6. The method of claim 5, wherein the metal in the metal sulfonate, the metal salt of an aliphatic carboxylic acid, the metal salt of an alicyclic carboxylic acid, the metal acetylacetonate, the metal naphthenate, the metal 2-ethylhexanoate, the metal octanoateoctanoate, the metal trifluoromethanesulfonate, and the organic material containing a metal is selected from the group consisting of aluminum; barium; bismuth; calcium; cerium; chromium; cobalt; copper; erbium; europium; gadolinium; gallium; hafnium; holmium; indium; iridium; iron; lanthanum; lutetium; magnesium; molybdenum; neodymium; niobium; strontium; tin; tungsten; vanadium; zinc; zirconium; and any combination thereof.

7. The method of claim 5, wherein the metal naphthenate is magnesium naphthenate.

8. The method of claim 5, wherein the metal 2-ethylhexanoate is selected from the group consisting of tin 2-ethylhexanoate; bismuth 2-etheylhexanoate; molybdenum 2-ethylhexanoate; and any combination thereof.

9. The method of claim 5, wherein the metal octanoate is zirconium octanoate.

10. A method comprising:

providing a treatment fluid comprising an oil-based fluid component and an oil-soluble weighting agent that comprises a metal selected from the group consisting of iron acetylacetonate; beryllium acetylacetonate; gallium acetylacetonate; gallium trifluorormethanesulfonate; and any combination thereof, solubilizing the oil-soluble weighting agent in the oil-based fluid component of the treatment fluid, wherein the oil-soluble weighting agent increases the density of the oil-based fluid component to a density in the range of from about 0.8 g/cm$^3$ to about 3.0 g/cm$^3$;

introducing the oil-based treatment fluid into a wellbore in a subterranean formation.

11. The method of claim 10, wherein the oil-soluble weighting agent has a density in the range of from about 1.1 g/cm$^3$ to about 22 g/cm$^3$.

12. The method of claim 10, wherein the increased density of the oil-based fluid component caused by the oil-soluble weighting agent reduces the equivalent circulating density of the treatment fluid.

13. The method of claim 10, wherein the oil-soluble weighting agent further comprises an additional metal selected from the group consisting of a metal salt of carboxylic acid; a metal salt of sulfonic acid; an oil-soluble chealant; and any combination thereof.

14. The method of claim 10, wherein the oil-soluble weighting agent further comprises an additional metal selected from the group consisting of a metal sulfonate; a metal salt of an aliphatic carboxylic acid; a metal salt of an alicyclic carboxylic acid; a ferrocene; a ferrocene derivative; a metal acetylacetonate; a metal naphthenate; a metal 2-ethylhexanoate; a metal octanoate; a metal trifluoromethanesulfonate; an organic material containing chlorine; an organic material containing fluorine; an organic material containing a metal; and any combination thereof.

15. A method of drilling a wellbore in a subterranean formation comprising:

providing a treatment fluid comprising an oil-based fluid component and an oil-soluble weighting agent that comprises a metal selected from the group consisting of iron acetylacetonate; beryllium acetylacetonate; gallium acetylacetonate; gallium trifluorormethanesulfonate; and any combination thereof;

wherein the oil-soluble weighting agent has a density in the range of from about 1.1 g/cm$^3$ to about 22 g/cm$^3$;

solubilizing the oil-soluble weighting agent in the oil-based fluid component of the treatment fluid, wherein the oil-soluble weighting agent increases the density of the oil-based fluid component to a density in the range of from about 0.8 g/cm$^3$ to about 3.0 g/cm$^3$; and circulating the treatment fluid during the drilling of the wellbore in the subterranean formation.

16. The method of claim 15, wherein the oil-soluble weighting agent further comprises an additional metal selected from the group consisting of a metal salt of carboxylic acid; a metal salt of sulfonic acid; an oil-soluble chealant; and any combination thereof.

17. The method of claim 15, wherein the oil-soluble weighting agent further comprises an additional metal selected from the group consisting of a metal sulfonate; a metal salt of an aliphatic carboxylic acid; a metal salt of an alicyclic carboxylic acid; a ferrocene; a ferrocene derivative; a metal acetylacetonate; a metal naphthenate; a metal 2-ethylhexanoate; a metal octanoate; a metal trifluoromethanesulfonate; an organic material containing chlorine; an organic material containing fluorine; an organic material containing a metal; and any combination thereof.

18. The method of claim 15, wherein the drilling fluid further comprises an additive selected from the group consisting of an inert solid; a fluid loss control agent; an emulsifier; a dispersion aid; a corrosion inhibitor; a viscosifying agent; a gelling agent; a particulate; a proppant; a lost circulation material; a foaming agent; a gas; a pH control additive;

a breaker; a biocide; a crosslinker; a stabilizer; a scale inhibitor; a clay stabilizing agent; a brine and any combination thereof.

* * * * *